United States Patent [19]

Zeis

[11] 4,179,660

[45] Dec. 18, 1979

[54] METHOD AND DEVICE FOR TRANSMITTING PULSE-DURATION MODULATED SIGNALS USING TWO OSCILLATORS

[75] Inventor: Jürgen Zeis, Berlin, Fed. Rep. of Germany

[73] Assignee: Licentia Patent-Verwaltungs-G.m.b.H., Fed. Rep. of Germany

[21] Appl. No.: 904,935

[22] Filed: May 11, 1978

[30] Foreign Application Priority Data

May 14, 1977 [DE] Fed. Rep. of Germany ....... 2721993

[51] Int. Cl.² ............................................. H04B 1/04
[52] U.S. Cl. ...................................... 325/59; 325/142; 325/164
[58] Field of Search ................. 325/142, 163, 164, 39, 325/40, 41, 59, 60, 61, 30, 141, 143, 145; 178/68; 329/104, 105, 106, 107, 108, 109

[56] References Cited

U.S. PATENT DOCUMENTS

| 3,622,885 | 11/1971 | Kruszynski | 325/59 |
| 3,683,278 | 8/1972 | Ohnsorge | 325/163 |
| 3,939,419 | 2/1976 | Lindner | 325/60 |
| 3,959,586 | 5/1976 | Blomenkamp | 178/68 |
| 4,037,173 | 7/1977 | Toman | 325/142 |

Primary Examiner—Robert L. Griffin
Assistant Examiner—Michael A. Masinick
Attorney, Agent, or Firm—McGlew and Tuttle

[57] ABSTRACT

A method of, and device for transmitting a pulse-duration modulated signal wherein information is contained in the position of pulse edges in the signal comprising, amplitude modulating a first carrier oscillation with the pulse duration modulated signal to form a first carrier frequency pulse train wherein the pulse duration does not always correspond to an integral number of carrier oscillation periods, and amplitude modulating a second carrier oscillation with the pulse duration modulated signal in phase opposition to the modulation of the first carrier oscillation to form a second carrier frequency pulse train wherein the pulse duration does not always correspond to an integral number of carrier oscillation periods, the start of the first and second carrier oscillations by the pulse duration modulated signal being in phase with each other, and the end of one of the first and second carrier oscillations being separated from the start of the other of the first and second carrier oscillations to prevent a distortion of one of the first and second carrier oscillations by the other of the first and second carrier oscillations.

11 Claims, 2 Drawing Figures

METHOD AND DEVICE FOR TRANSMITTING PULSE-DURATION MODULATED SIGNALS USING TWO OSCILLATORS

FIELD AND BACKGROUND OF THE INVENTION

The present invention relates in general to the transmission of information using signals and in particular to a new and useful method and device for transmitting a pulse duration modulated signal using two oscillators.

DESCRIPTION OF THE PRIOR ART

A device is known for transmitting signals that are indicative of two states or polarities in the signal. To this end two oscillators with unequal frequencies have been provided. A signal having one of the two polarities starts one oscillator while the other oscillator is kept in a switched-off state. By a signal of opposite polarity, the other oscillator is started, while the first one is switched off. The oscillations of both oscillators are transmitted, through a transistor to a common transfer line (See U.S. Pat. No. 3,525,054).

Problems arise with the aforementioned and similar arrangements (See U.S. Pat. No. 2,676,203 and German Auslegeschrift No. 1 237 615) if pulses are to be transmitted which are not always uniform in their duration. Such a necessity may arise if, on the one hand, it is required to transmit only pulses and, on the other hand, signals are to be transmitted which do not represent only two states but which are, for example, voice signals. The pulses then must be modulated with the signals, particularly so as to obtain the information on the position of the pulse edges. The pulses to be transmitted are preferably to be pulse duration modulated pulses. These modulated pulses are to be transmitted, for example, for the purpose of bridging a high voltage, by means of at least one carrier frequency signal which again may be composed of pulses.

With higher demands, difficulties may arise in such transmission arrangements because of the weighted and unweighted signal to noise ratio, as will hereinafter be discussed.

In a carrier-frequency transmission, that which is transmitted are not pulse duration modulated pulses (modulated, for example, with audio-frequency signals), but carrier-frequency pulses of corresponding duration and constant frequency. Since, due to the pulse duration modulation, the duration of these carrier frequency pulses is variable, not every carrier frequency pulse can comprise an integral number of carrier oscillations. Some of the carrier-frequency pulses rather comprise, at their start and/or end, fragments of a complete carrier oscillation period. These fragments may lead to disturbances in the transmission. One cause of such disturbances is that the fragments have a wide frequency spectrum which cannot be handled by the path of transmission. Consequently, distortions appear in the transmission path. For example, with a continuously decreasing duration of consecutive carrier frequency pulses, it has been found that the amplitude of the fundamental wave of the demodulated carrier-frequency signal (i.e. of the pulse-duration modulated pulses) does not decrease continuously, but alternately, continuously and in steps. Thus, what is obtained is an undesirably non-linear relation between the modulated duration of the carrier frequency pulses and the demodulated (audio-frequency) signals (fundamental wave of the pulse-duration modulated pulses). This non-linear relationship affects the quality of transmission.

SUMMARY OF THE INVENTION

The present invention is directed to an improvement in the transmission performance of a transmission system, in cases where pulses are present in the transmission path which are to be transmitted at a carrier frequency and carry information which is contained in the position of the pulse edges.

This problem is solved, in accordance with the invention, by providing a carrier-frequency pulse-transmitting system which uses the carrier oscillation of an oscillator that can be switched on by the pulses. Two oscillators are provided for transmitting information contained in the position of the pulse edges which are transmitted from a transmitter to a receiver. The two oscillators have unequal carrier frequencies and/or different transmission paths. One oscillator can be switched on, while always in the same phase, by the switch-on edges of the pulses and the other can be switched on, again while always in, the same phase, by the switch-off edges of the pulses. A demodulator is provided on the receiving side of the system for evaluating the starting positions of the carrier frequency pulses relative to each other which alternately arrive from one or the other of the oscillators.

The invention also relates to a method in which, by means of a carrier frequency, pulses are transmitted which contain information in the position of their edges, whereby a high weighted and unweighted signal to noise ratio is ensured. At the transmitter side, two carrier-frequencey oscillators are used, one of which is always switched on in the same phase, by the switch-on edges of the pulses, and the other oscillator is always switched on in the same phase by, the switch-off edges of the pulses. In the demodulator at the reception side, the position relative to each other of the starts of the carrier frequency pulses alternately delivered by the two oscillators is evaluated.

By using two oscillators, each for generating one sequence of trains of carrier frequency pulses and each being set in oscillation in always the same phase position, it can be obtained that the oscillation fragments occurring at the end of the carrier frequency pulses and having variable lengths are not taken into account during demodulation. For this purpose it is necessary for the demodulator to alternately evaluate the starts of the one and then the other carrier frequency pulse, but to neglect the ends of each. The source of disturbances is thereby eliminated, since no fragment appears at the start of each carrier frequency pulse and the disturbing fragment at the end of the carrier frequency pulse is no longer evaluated in demodulation. If only one oscillator is provided for generating carrier frequency pulse trains, disturbances by the signal fragments could not be avoided.

Under unfavorable conditions, it might happen in the application of the invention, that oscillation fragments of one oscillator could disturbingly affect demodulation of the starting of the other oscillator. That is, upon the arrival of an end fragment of an oscillation from one oscillator, the demodulator, at that instant, evaluates the start of an oscillation of the other carrier frequency pulse, and this other oscillator is started just at the instant the first oscillator ceases to oscillate. To avoid such mutually disturbing influences, it is advantageous to slightly shift the switch-on and -off instants of one oscillator relative to the corresponding instants of the other oscillator, for example, by the duration of a fragmentary portion of a carrier oscillation period, such as the period of time of a half carrier oscillation. This shift must, of course, be compensated in demodulation. In this way, it is ensured that during the transmission and demodulation the ends of each carrier frequency pulse are separated in time from the starts of the next pulse to such an extent that the starts of carrier frequency pulses cannot be disturbed by simultaneously occurring ends of other pulses. This separation may also be effected in space (for example, by providing separate transmission paths employed by the carrier frequency pulse trains alternately) and/or by a suitable design of the oscillators and/or the demodulator. If different transmission paths for the carrier frequency pulse trains of different oscillators are provided, the demodulator may, for example, after each identification of a start of a carrier frequency pulse, switch from one transmission path to the other, to identify the next start of a carrier frequency pulse, and so forth. In this manner, a separation of the starts and ends of the carrier frequency pulses is ensured by switching over the demodulator.

If different transmission paths for the frequency pulse trains of both oscillators are used and, at the same time, a potential difference is to be bridged, by means of a voltage-proof transfer element between the transmitter and the receiver, the voltage-proof element is to be provided in each of the different transmission paths. One of the voltage-proof elements may be saved, however, if carrier oscillations with mutually different frequencies are delivered by the oscillators and a single voltage-proof transfer element is provided for both carrier oscillations. Then, the demodulator in the receiver must comprise a diplexer for the two different frequencies.

As a voltage-proof transfer element, a transformer has proved best suitable for the inventive purpose, because of its capability of delivering a high voltage level at its output, whereby a high signal to noise ratio is ensured.

Accordingly, an object of the present invention is to provide a method for transmitting a pulse duration modulated signal wherein information is contained in the position of a switch-on edge and a switch-off edge of a pulse in the signal comprising amplitude modulating a first carrier oscillation with the pulse duration modulated signal to form a first carrier frequency pulse train wherein the pulse duration does not always correspond to an integral number of carrier oscillations.

A further object of the invention is to provide a device for transmitting pulse duration modulated signals having a switch-on edge and a switch-off edge comprising, a first oscillator, means for starting and stopping said first oscillator with the switch-on edge and switch-off edge respectively of the pulse duration modulated signal, a second oscillator independent of said first oscillator, means connected to said second oscillator for starting said second oscillator with the switch-off edge of the pulse duration modulated signal, means connected to said first and second oscillators for separating the start of one of the first and second oscillators from the stopping of the other of the first and second oscillators, and demodulator means connected to the first and second oscillators for evaluating the start of each of the first and second oscillators to transmit the pulse duration modulated signal.

The various features of novelty which characterize the invention are pointed out with particularity in the claims annexed to and forming a part of this disclosure. For a better understanding of the invention, its operating advantages and specific objects obtained by its uses, reference should be made to the accompanying drawings and descriptive matter in which there is illustrated a preferred embodiment of the invention.

DESCRIPTION OF THE PREFERRED EMBODIMENT

Figure 1:
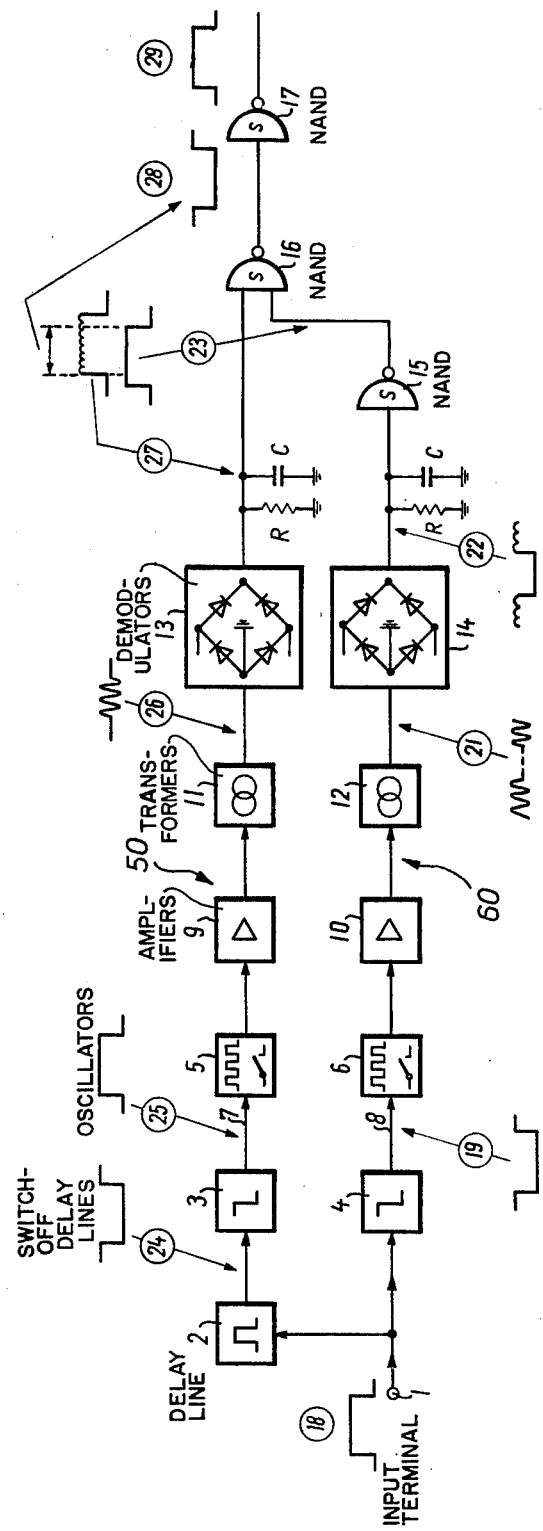
FIG. 1 is a block diagram of an embodiment of the invention.

Experience has shown that if a free-running oscillator is not keyed by a pulse-duration modulated pulse, but switched on by these pulses, the start of a carrier frequency pulse can be definitely determined. This, however, is not true for the switching off of the oscillator. Therefore, a second oscillator is needed which is switched on at the end of the same duration-modulated pulse by which the first oscillator was switched on. In the embodiment shown, two transmission paths 50 and 60 are provided which are supplied, through a common input terminal 1, with audio-frequency pulse-duration modulated pulses having a pulse frequency of 50 kHz. A delay line 2, having a time delay of 80 nanoseconds for the on and off switching, is connected in the upper branch 50 of the circuit. Switch-off delay lines 3 and 4, each of 80 nanoseconds, are also provided in both branches. These are followed in each branch by an oscillator 5,6 for producing a square wave pulse carrier oscillation. The oscillators are switched on and off through lines 7 and 8. Lines 7 and 8 with terminal 1 and devices 2, 3 and 4 comprise input means for applying the signal 18 to the oscillators 5, 6. Amplifiers 9 and 10 are provided in the transmission paths as are high-voltage-proof transfer elements 11 and 12 which are in the form of isolating transformers. Each transformer 11,12 is followed by a demodulator 13,14 respectively, which is in the form of a rectifier circuit with a following resistor R and capacitor C. A NAND gate 15 is provied in the lower branch and serves as an inverter and another NAND gate 16 derives from the pulse trains of the two transmission paths the desired pulse-duration modulated pulse train which, finally, is inverted in a NAND gate 17.

To be secure against disturbing pulses, at the receiver side (to the right of transfer elements 11 and 12), the pulse-duration modulated pulses are not produced by the switch-on edges of the carrier oscillations, for example, by setting and resetting a flip-flop, but by a voltage comparison of the rectified carrier oscillations in NAND gate 16.

To avoid a coincidence between the switch-on edge of one of the oscillators 5 and the disturbing switch-off edge of the other oscillator 6, at the transmitter side of the circuit (to the left of transfer elements 11, 12), the switching conditions are shifted in time relative to each other by the delay line 2.

The switch-off delay lines 3 and 4 have proved necessary due to the fact that almost 100 nanoseconds elapse between the instant of switching on and a starting of oscillators 5 and 6. The distortion produced in the pulse-duration modulated pulses which are to be transmitted had to be corrected in each branch using a switch-off delay which is provided by means of switch-off delay lines 3, 4.

Figure 2:
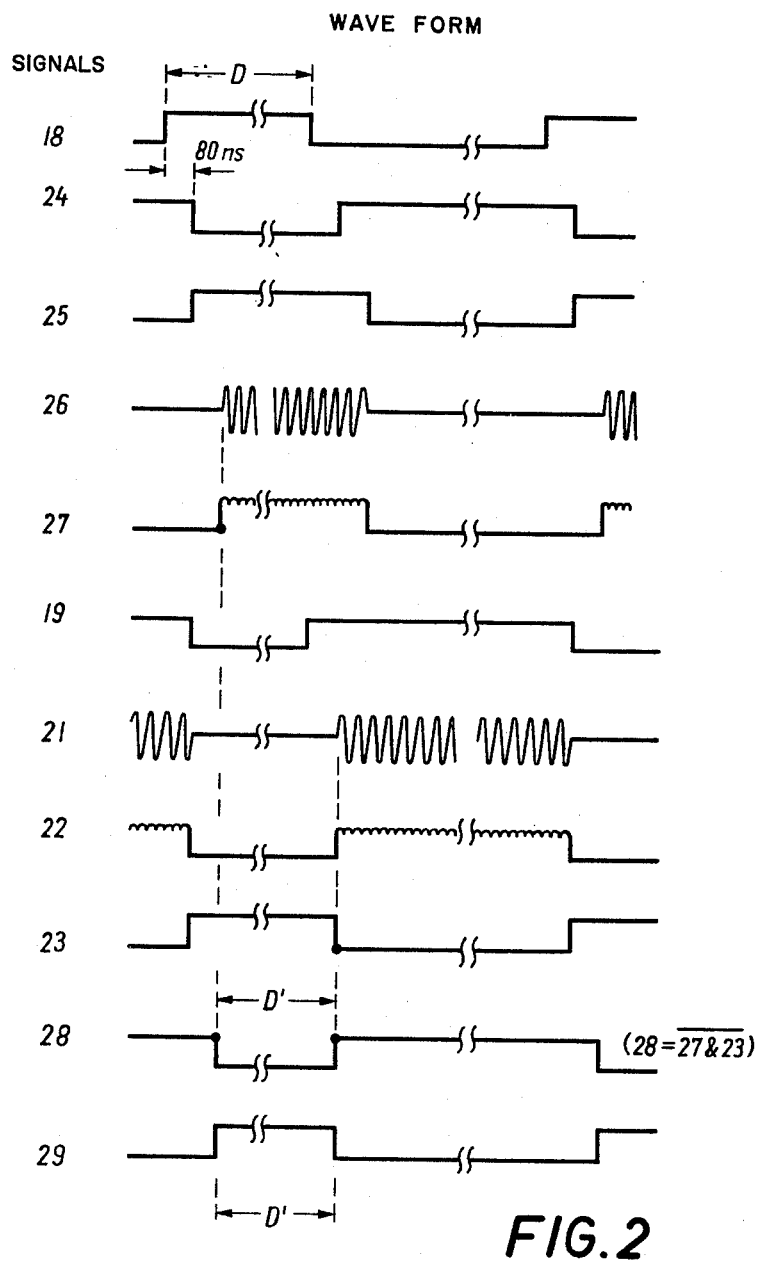
FIG. 2 is a pulse-time diagram associated with the diagram of FIG. 1.

At reference numerals 18 to 25, the wave forms for a common instant are shown under the assumption that the pulse shown at 18 is just arriving at input terminal 1. In FIG. 2, these conditions are shown in more detail. The positive pulse at 18 has a duration D. It is delayed in delay line 2 by 80 nanoseconds and inverted (24). In switch-off delay line 3, the rising edge of pulse train 24 is delayed, so that the form shown at 25 is obtained. With this pulse train 25, oscillator 5 is switched on or off, with the switching on, however, being delayed by about 80 nanoseconds (carrier frequency pulse train 26). Upon rectification in demodulator 13, the train form 27 is obtained.

In the lower transmission path 60 of FIG. 1, initially the pulse train 19 is formed after the switch-off delay line, which is produced from pulse 18 by inversion and by delaying the rising edge by 80 nanoseconds. With pulse train 19 oscillator 6 is switched on with delay and switched off without delay, so that carrier frequency pulse train 21 is obtained at the output of transformer element 12. After rectification in demodulator 14, the train 22 is then formed which is inverted in NAND gate 15 to form the pulse train 23.

Finally, at the output of NAND gate 16, a negative pulse with the duration D' is formed from pulse trains 23 and 27, provided that both pulse train 23 and pulse train 27 have positive values. After inversion, pulse train 29 is produced from pulse train 28.

It is apparent that the duration D' is shorter than D (pulse train 18). In the present example, however, in which the pulse frequency of pulse train 18 is about 50 kHz, this difference is negligibly small. In addition, this difference could be compensated by a corresponding design of the circuit after NAND gate 16. If NAND gate 17 is followed by a pulse amplifier having a switch-on delay smaller than the switch-off delay, it is even advantageous to have D' shorter than D, since in such a switching amplifier, the positive pulse of pulse train 29 is necessarily extended in time.

The duration D' may be influenced in still other ways, for example, by providing a delay line with a switch-off and switch-on delay instead of switch-off delay line 4, and, at the same time, doubling the switch-off delay of delay line 2. In all possible variants of the shown example, however, what matters is that the starts and ends of the carrier frequency pulses must, as far as possible, be spaced in time from each other and that in any case, the pulse edges of pulse train 28 must be determined only by the starts of the carrier frequency pulses.

The shown example also has the additional advantage of redundancy in that upon a failure in the lower transmission path 60, the operation can be continued, even if somewhat impaired in quality.

In practice, it is useful not to provide both oscillators 5 and 6 in a single integrated circuit, to prevent them from disturbing each other during their being switched on and off. It is also purposeful to uncouple the two oscillators from each other by providing RC networks.

The essence of the invention and its purpose may be summarized as follows: In the wire or wireless carrier-frequency transmission of duration-modulated pulses which are imparted to the carrier frequency by keying, an unsatisfactory weighted and unweighted signal to noise ratio is obtained since the corresponding carrier frequency pulse train, depending on the duration of the pulses to be transmitted, is not always an integral multiple of one carrier oscillation period but comprises, on its leading and/or trailing end, a portion or fraction of a carrier oscillation. In accordance with the invention, this is prevented by the provision that at every change of polarity of the duration-modulated pulses, one carrier frequency oscillator is started and continues to oscillate up to the next polarity change. The carrier frequency pulse trains thereby alternately produced are transmitted, through separate transmission paths or by multiplex transmission, to the receiver and there demodulated, with the evaluation only of the starts of the carrier frequency pulses. In both cases (i.e. with separate transmission paths as well as with a single-path multiplex transmission) it must be ensured that the starts of the carrier frequency pulses are not disturbed by simultaneously occurring ends of carrier frequency pulses. With separate transmission paths, this may be done by the separation in space of the paths and alternate switching of the demodulator from one transmission path to the other, in order to alternately evaluate the starts of the carrier frequency pulses. With a multiplex transmission, this may be ensured by a suitable delay of the ends and/or starts of the carrier frequency pulses of one oscillator relative to the other.

While specific embodiments of the invention have been shown and described in detail to illustrate the application of the principles of the invention, it will be understood that the invention may be embodied otherwise without departing from such principles.

What is claimed is:

1. A method of transmitting a signal containing pulses wherein information is contained in the position of the edges of the pulses, each pulse having a duration defined between switch-on and switch off edges, comprising producing a first carrier frequency oscillation train, producing a second carrier frequency oscillation train, said first carrier frequency oscillation train being started by the switch-on edge of the pulse in the signal and the second carrier frequency oscillation train being started by the switch-off edge of the pulse in the signal, the start of said first and second carrier frequency oscillation trains being in phase with each other, seperating the start of one of said first and second carrier frequency oscillation trains from the end of the other of said first and second carrier frequency oscillation trains by delaying the pulse in the signal for starting one of the carrier frequency oscillation trains whereby the respective starts and ends of one of the carrier oscillation trains does not distrub the repective ends and starts of the other of said carrier frequency oscillation trains, and demodulating said first and second carrier frequency oscillation trains by evaluating only the starts of each of said first and second carrier frequency oscillation trains.

2. A device for transmitting a pulse-duration modulated signal wherein information is contained in the duration of a pulse in the signal the pulse having a switch-on edge and a switch-off edge, comprising, a first oscillator for generating a first carrier frequency pulse train, input means for applying the signal connected to said first oscillator for switching said oscillator on and off with respective switch-on and switch-off edges of the signal, a second oscillator for generating a second carrier frequency pulse train, said input means connected to said second oscillator for switching said second oscillator on with a switch-off edge of said pulse duration modulated signal, said first and second oscillators being switched on in phase with each other and the duration between a switch-on edge and a switch-off edge of a pulse in the pulse duration modulated signal not always corresponding with an integral number of carrier oscillation periods of said first and second carrier frequency pulse trains, delay means connected to at least one of said first and second oscillators for separating the starting of one of said first and second oscillators from the stopping of the other of said first and second oscillators by the pulse duration modulated signal, and a demodulator connected to said first and second oscillators for evaluating the start of each of said first and second oscillators only, whereby the stopping of each of said first and second oscillators is disregarded.

3. A device according to claim 2 wherein said first oscillator generates said first carrier frequency pulse train at a different frequency from said second carrier frequency pulse train generated by said second oscillator, whereby said first and second oscillators operate independently of each other.

4. A device according to claim 3, including a single voltage proof transfer element connected between said first and second oscillators and said demodulator, said voltage proof transfer element comprising a diplexer.

5. A device according to claim 4, wherein said voltage proof transfer element comprises a transformer.

6. A device according to claim 2, wherein said first oscillator is disposed in a first transmission path and said second oscillator is disposed in a second transmission path whereby said first and second oscillators are independent of each other with said respective means for starting said first and second oscillators and said respective means for separating the starting of one of said oscillators from the switching off of the other of said oscillators being disposed in said first and second transmission paths respectively.

7. A device according to claim 6, wherein said input means include delay line means for displacing the respective starting and stopping of said first oscillator in time with respect to the starting and stopping of said second oscillator.

8. A device according to claim 6, further including a voltage-proof transfer element between each of said first and second oscillators and said demodulator.

9. A device according to claim 8, wherein said voltage proof transfer element comprises a transformer.

10. A device for transmitting a signal with pulses having switch-on and switch-off edges comprising, a first transmission path for receiving said signal and a second transmission path for receiving said signal, a delay element in said first transmission path for delaying and inverting a pulse in the signal, a first delay line in said first transmission path connected to said delay element for inverting the signal from said delay element and delaying the switch-off edge of a pulse in the signal, a first oscillator connected to said first delay line for generating a first carrier frequency pulse train, said first oscillator adapted to be started by a switch-on edge of a pulse in the signal coming from said first delay line, a demodulator means connected to said first oscillator for receiving said generated first carrier frequency pulse train, a second delay line in said second transmission path for inverting the signal and delaying a switch-on edge of a pulse in the signal, a second oscillator connected to said second delay line for generating a second carrier frequency pulse train, said second oscillator adapted to be started by a switch-off edge in a pulse of the signal coming from said second delay line, said second oscillator being connected to said demodulator means, said demodulator means comparing a starting of said first and second oscillators to reconstruct the signal, whereby a stopping of said first and second oscillators by the signal is disregarded and a starting of one of said first and second oscillators is separated in time from a stopping of the other of said first and second oscillators.

11. A method for transmitting a pulse duration modulated signal having a switch-on and switch-off edge comprising delaying the switch-on edge of a pulse in the signal, using the delayed switch-on edge of the pulse to start a first oscillator and generate a first carrier frequency pulse train, delaying the switch-off edge of a pulse in the signal, using the delayed switch-off pulse to start a second oscillator and generate a second carrier frequency pulse train, said first carrier frequency pulse train being switched off by a delayed switch-off edge of a pulse in the signal whereby the switch-off of said first carrier frequency pulse train is separated in time from the switch-on of said second carrier frequency pulse train, comparing the switch-on of said first and second carrier frequency pulse trains to reconstitute the pulse duration modulated signal.

* * * * *